April 26, 1938.  W. J. LEACH  2,115,639

CENTRIFUGAL THRASHING AND SEPARATING DEVICE

Filed Sept. 22, 1936  2 Sheets-Sheet 1

William J. Leach
INVENTOR

BY Victor J. Evans & Co.
ATTORNEYS

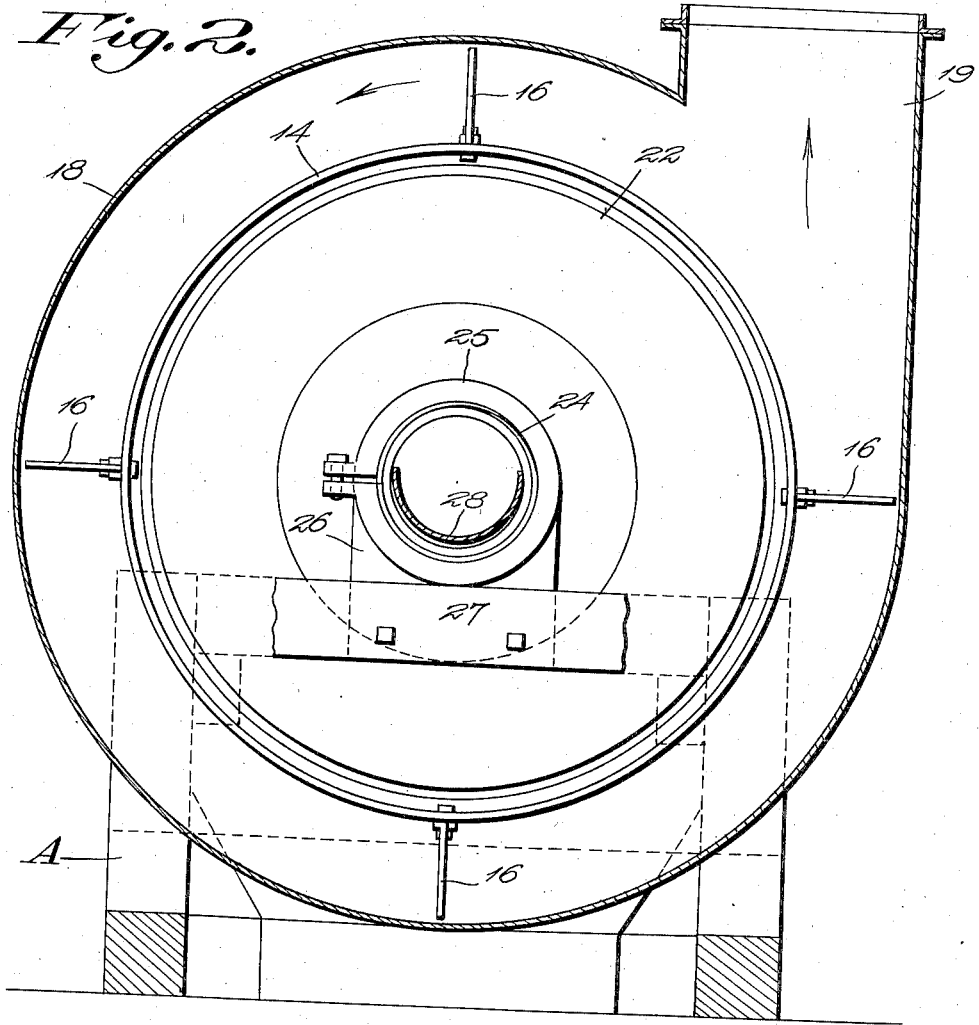
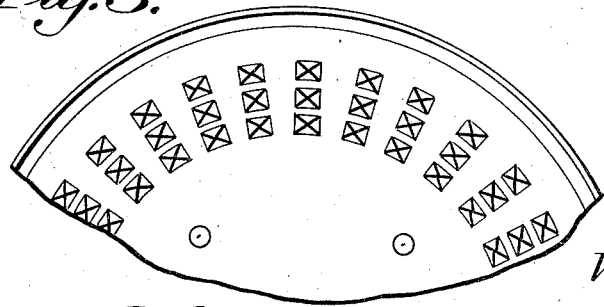
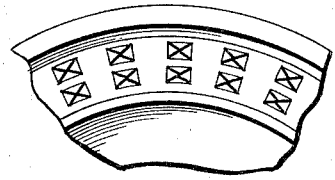

Patented Apr. 26, 1938

2,115,639

UNITED STATES PATENT OFFICE 2,115,639

CENTRIFUGAL THRASHING AND SEPARATING DEVICE

William J. Leach, Burlington, Wis.

Application September 22, 1936, Serial No. 102,002

1 Claim. (Cl. 130—27)

The invention relates to a combined thrasher and separator and is adaptable for use in thrashing of all kinds of grain to eliminate the chaff, straw and dirt from the grain kernels.

The primary object of the invention is the provision of a device of this character, wherein the material is fed centrally through a stationary disk coacting with a rotating disk which is of novel construction so that the grain kernels can be separated from the straw and chaff and a thorough thrashing obtained with the kernels delivered from the device and the straw delivered separated from the kernels.

Another object of the invention is the provision of a device of this character, wherein through centrifugal action the sheaf of grain and the kernels will be separated and such grain equally distributed or spread in all directions while the centrifugal force developed within the device delivers the grain through an annular space between the stationary and revolving disks, these having teeth thereon so that the grain under thrashing will be knocked from the straw and the grain delivered at one point and the straw at another, the device being novel in its entirety.

A further object of the invention is the provision of a device of this character, wherein there is but a single moving part and in the working thereof the thrashing and separating of the grain and straw is materially simplified requiring minimum power for the working of such device and also enabling the lightening of the weight of such device.

A still further object of the invention is the provision of a device of this character, which is simple in its construction, thoroughly reliable and effective in its operation, durable, enabling the thrashing and separating of grain and straw, chaff or other foreign matter with dispatch, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 2 is a sectional view on the line 2—2 of Figure 1 looking in the direction of the arrows.

Figure 3 is a fragmentary plan view of the rotary disk of the device.

Figure 4 is a view similar to Figure 3 of the stationary disk of such device.

Similar reference characters indicate corresponding parts throughout the several views in the drawings.

Figure 1:
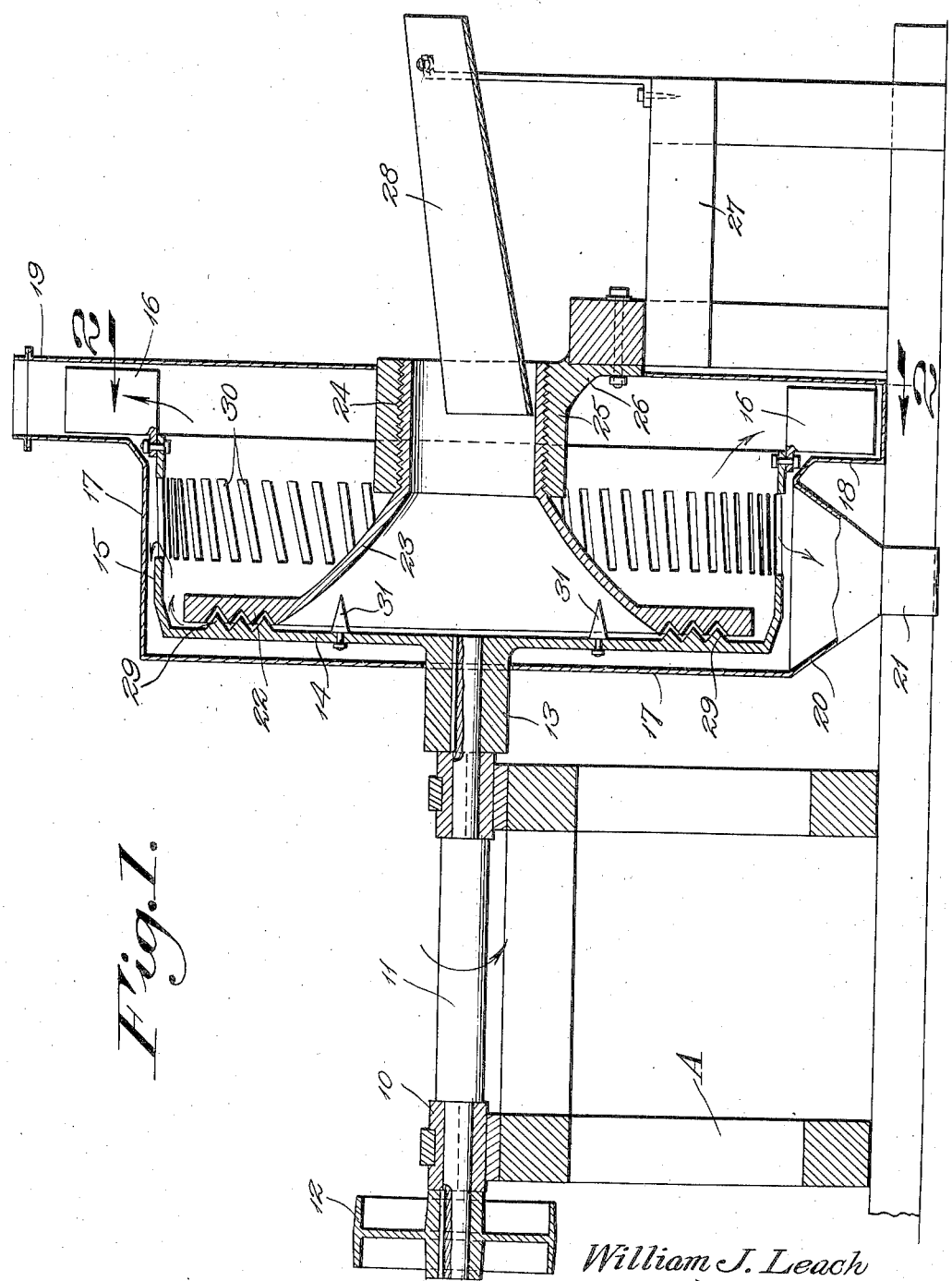
Figure 1 is a vertical longitudinal sectional view through the device constructed in accordance with the invention.

Referring to the drawings in detail, a standard A of any suitable design carries conventional bearings 10 for a power shaft 11, this fitted at one end with a belt pulley 12 for the driving from any suitable source of motive power while the other end of said shaft 11 has fitted securely thereon the hub 13 of a cupped rotary disk 14. The cup wall 15 of this disk 14 has fitted therewith radially disposed fan blades 16 constituting a fan.

The disk 14 is within a housing or casing 17 and likewise the blades 16 rotate within a fan casing extension 18 on the housing 17 while at the periphery of this casing 18 and extended perpendicular at a tangent to the said casing 18 is a straw discharge stack 19 for the dispersing of straw, chaff, dirt or other foreign matter from the device. Depending from the housing 17 and formed therewith is a grain kernel delivery hopper 20, it having the discharge spout 21 for the delivery of grain kernels from the housing and the deposit thereof at the required locality.

Confronting the disk 14 and inwardly located within the cup wall 15 of said disk is a stationary disk 22, it having a hollow cone center 23 with an externally threaded neck 24 adjustably screwed within a collar-like mounting 25 having a bracket extension 26. This bracket extension is bolted or otherwise fastened upon a stand 27 and such mounting 25 is carried centrally through the casing 18. By adjustment of the stationary disk 22, it can be moved toward or away from the rotary disk 14.

The stand 27 supports a feed trough or table 28 which opens into the neck 24 of the cone 23 of said stationary disk 22 and such trough or table feeds the sheaf of grain into the device. The cone 23 of the stationary disk 22 constitutes a hopper for spreading the grain equally in all directions when centrifugal force is developed through the rotation of the disk 14.

The disks 14 and 22 have on their confronting faces spaced annular rows of teeth 29 and under action thereof thrashing is accomplished for the knocking of the kernels of grain off of the straw when the device is operated.

The cup wall 15 of the disk 14 has formed therein an annular series of diagonally placed slots 30 which function to take the grain out of the straw and impel the straw across the face of said wall 15 of the disk 14 to the blades 16 of the fan where the straw will enter the stack 19 for discharge from the device. This disk 14 with the wall 15 constitutes a drum and the slots in said wall 15 facilitate the separation of the grain from the straw and impel the straw forward into the fan after it has been separated from the grain.

The stationary disk 22 under adjustment thereof with respect to the disk 14 varies the gap between these disks for the thrashing of different kinds of grain, the stationary disk 22 being locked in the mounting 25 in any suitable manner on adjustment of the same.

In the operation of the device the sheaf of grain is placed on the trough or table 28 and is fed to the machine through the opening in the neck 24 into the hopper created by the cone 23 of the stationary disk 22. This hopper spreads the grain equally in all directions and the centrifugal force developed by the rotation of the disk 14 feeds the grain through the space between the disk 14 and the disk 22 while the teeth 29 knock the kernels of grain off the straw. The straw and grain together pass from between the disks 14 and 22 for entering the drum created by the wall 15 on the disk 14 whence the straw will traverse this drum into the fan and the grain separated from the straw being delivered into the hopper 20 while the straw will enter the stack 19.

Concentrically of the rotary disk 14 and operating within the cone center 23 of the disk 22 is an annular row of spaced spurs or projections 31 which act upon the sheaf of grain fed into the cone 23 during the working of the device.

What is claimed is:

A centrifugal thrashing and separating device comprising confronting disks, a cupping wall peripherally on one disk, radially disposed fan blades carried at the free edge of the cupping wall and extending outwardly relative thereto, a cone formed centrally of the other disk and having an externally threaded neck, a stationary collar-like mounting having the said neck adjustably threaded therein, means for introducing material through the neck and cone to between the disks, means for imparting rotary movement to the disk having the cupping wall, a housing about said disks and fan blades, outlet conduits next to the fan blades and the disks, respectively, the said cupping wall having an annular series of diagonally disposed slots for taking grain out of straw across the face of said cupping wall and delivering the straw to the blades for the discharge of the straw, and a plurality of rows of spaced teeth projecting from confronting faces of the said disks.

WILLIAM J. LEACH.